United States Patent Office 2,978,488
Patented Apr. 4, 1961

2,978,488

ALKYNYLENE NITRO-DICARBAMATES

Milton B. Frankel, Pasadena, Calif., assignor to Aerojet-General Corporation, Azusa, Calif., a corporation of Ohio No Drawing. Filed Jan. 3, 1955, Ser. No. 479,655

16 Claims. (Cl. 260—482)

This invention relates to new compositions of matter and a method for their preparation. In particular, it relates to alkylene nitro-dicarbamates having the general formula:

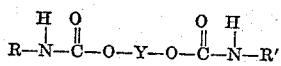

wherein R and R' are the same or different and are nitroalkyl radicals, and Y is an alkynylene radical.

The compounds of this invention are prepared by condensing nitro-isocyanates with alkyne-diols, in accordance with the general reaction scheme set forth below:

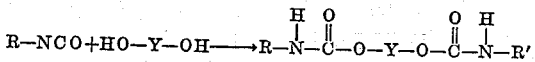

wherein R, R' and Y are as defined above. Nitro dicarbamates which R and R' are different are prepared by employing a mixture of isocyanates in the reaction.

As a matter of convenience, the reaction is usually conducted at reflux temperature. Although lower temperatures can be used, the rate of reaction is usually too slow for practical purposes, while at higher temperatures, the reaction is difficult to control. The reaction is preferably conducted in the presence of a condensation catalyst such as ferric acetylacetonate. Increased smoothness and control of the reaction are achieved when a reaction solvent such as chloroform is used.

The nitro-isocyanates used as starting materials in this invention are prepared by reacting nitro-acid halides with sodium azide and subsequently heating the resultant organic azides under anhydrous conditions to effect their rearrangement to the isocyanates, as disclosed in assignee's copending applications Serial No. 405,515, filed January 21, 1954, now Patent No. 2,923,726, and Serial No. 416,386, filed March 15, 1954, now abandoned. The nitro-acid halides are obtained in the conventional manner by reacting a thionyl halide with a nitro-acid, such as 3,3-dinitrobutanoic and 3,3-dinitropentanoic acid. A wide variety of such nitro-acids can be prepared by condensing unsaturated acids, such as acrylic acid, with nitronate salts of alkanes, as described in J. Org. Chem., vol. 16, pp. 161-4, 1951.

To more clearly illustrate my invention, the following example is presented. It should be understood, however, that this example is presented merely as a means of illustration, and is not intended to limit the scope of the invention in any way.

EXAMPLE I

*Preparation of N,N'-bis(3,3,3-trinitropropyl)-2-butyne dicarbamate*

Equivalent quantities of 1,4-butynediol and 3,3,3-trinitropropyl isocyanate were refluxed with about 1% by weight ferric acetylacetonate for eight hours. The solution was then evaporated to dryness in vacuo, leaving a quantitative yield of a yellow oil, which was identified as N,N'-bis(3,3,3-trinitropropyl)-2-butyne dicarbamate.

The ballistic properties of N,N'-bis(3,3,3-trinitropropyl)-2-butyne dicarbamate are as follows:

Calculated lead block value: 111 TNT=100.
Calculated ballistic mortar value: 121 TNT=100.

As disclosed in my copending application Serial No. 479,657, filed concurrently with the present application, the N,N' nitrated derivative of the above compound is a solid, M.P. 94–96° C., having an actual heat of combustion of 1834 cal./gm.

A wide variety of compounds can be prepared in accordance with the procedure set forth in Example I. N,N'-bis(3,3-dinitrobutyl)-2-butyne dicarbamate is prepared by condensing 1,4-butyne-diol with 3,3-dinitrobutyl isocyanate; N,N'-bis(3,3,3-trinitropropyl)-3-hexyne dicarbamate is prepared by condensing 3-hexyne-1,6-diol with 3,3,3-trinitropropyl isocyanate; and unsymmetrical N'-3,3-dinitrobutyl-N-3,3,3-trinitropropyl-2-butyne dicarbamate is prepared by reacting 2-butyne-1,4-diol with a mixture of 3,3-dinitrobutyl isocyanate and 3,3,3-trinitropropyl isocyanate.

It is apparent that any member of this series of alkynylene nitro-dicarbamates can be prepared by merely condensing the appropriate nitro-isocyanate with an alkyne diol, according to the teachings of this invention.

The valuable alkynylene nitro-dicarbamates of this invention readily undergo nitration to form valuable high explosives, as disclosed in my copending application Serial No. 479,657, filed concurrently with the present application. The high explosives thus obtained can be used in any conventional explosive missile, projectile, rocket, or the like, as the main explosive charge. An example of such a missile is disclosed in United States Patent No. 2,470,162, issued May 17, 1949. One way of using the high explosives of this invention in a device such as that disclosed in United States Patent No. 2,470,162, is to pack the crystalline explosive in powder form into the warhead of the missile. Alternatively, the crystals can be first pelletized and then packed. A charge thus prepared is sufficiently insensitive to withstand the shock entailed in the ejection of a shell from a gun barrel or from a rocket launching tube under the pressure developed from ignition of a propellant charge, and can be caused to explode on operation of an impact- or time fuse-mechanism firing a detonating explosive such as lead azide or mercury fulminate.

I claim:

1. As compositions of matter, alkynylene nitro-dicarbamates having the general formula:

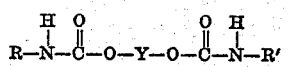

wherein R and R' are lower nitroalkyl radicals and Y is a lower alkynylene radical.

2. As a composition of matter, N,N'-bis(3,3,3-trinitropropyl)-2-butyne dicarbamate having the structural formula:

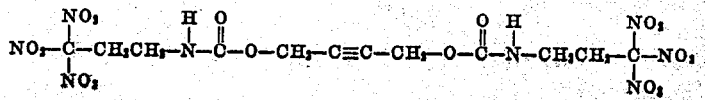

3. As a composition of matter, N,N'-bis(3,3-dinitrobutyl)-2-butyne dicarbamate having the structural formula:

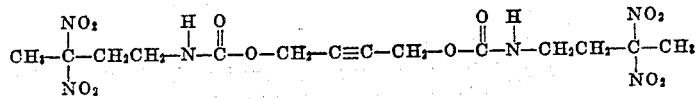

4. As a composition of matter, N,N'-bis(3,3,3-trinitropropyl)-3-hexyne dicarbamate having the structural formula:

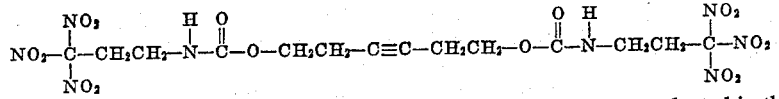

5. As a composition of matter, N'-3,3-dinitrobutyl-N-3,3,3 - trinitropropyl - 2 - butyne dicarbamate having the structural formula:

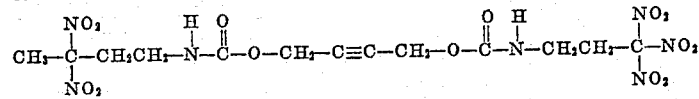

6. The method of preparing alkynylene nitro-dicarbamates having the general formula:

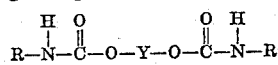

which comprises reacting a nitro-containing isocyanate with an alkyne diol having the general formula:

HO—Y—OH wherein R and R' are lower nitroalkyl radicals and Y is a lower alkynylene radical.

7. The method of claim 6 wherein the reaction is conducted in the presence of ferric acetylacetonate.

8. The method of claim 7 wherein the reaction is conducted in the presence of an inert solvent.

9. The method of preparing N,N'-bis(3,3,3-trinitropropyl)-2-butyne dicarbamate which comprises reacting 3,3,3-trinitropropyl isocyanate with 2-butynediol.

10. The method of claim 9 wherein the reaction is conducted in the presence of ferric acetylacetonate.

11. The method of preparing N,N' - bis(3,3 - dinitrobutyl)-2-butyne dicarbamate which comprises reacting 3,3-dinitrobutyl isocyanate with 1,4-butynediol.

12. The method of claim 11 wherein the reaction is 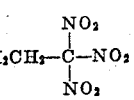 conducted in the presence of ferric acetylacetonate.

13. The method of preparing N,N'-bis(3,3,3-trinitropropyl)-3-hexyne dicarbamate which comprises reacting 

3,3,3-trinitropropyl isocyanate with 3-hexyne-1,6-diol.

14. The method of claim 13 wherein the reaction is conducted in the presence of ferric acetylacetonate.

15. The method of preparing N'-3,3-dinitrobutyl-N-3,3,3 - trinitropropyl - 2 - butyne dicarbamate which comprises reacting 1,4-butynediol with a mixture of 3,3,3-trinitropropyl isocyanate and 3,3-dinitrobutyl isocyanate.

16. The method of claim 15 wherein the reaction is conducted in the presence of ferric acetylacetonate.

References Cited in the file of this patent

UNITED STATES PATENTS 2,703,810   Viard _____ Mar. 8, 1955

OTHER REFERENCES

Gaylord: Journal of Organic Chemistry, volume 20, No. 4, pages 546–548 (1955); received for publication Dec. 22, 1954.